United States Patent [19]

Rambauske

[11] 4,183,664

[45] Jan. 15, 1980

[54] OPTICAL APPARATUS

[75] Inventor: Werner R. Rambauske, Carlisle, Mass.

[73] Assignee: Raytheon Company, Lexington, Mass.

[21] Appl. No.: 726,079

[22] Filed: Sep. 23, 1976

[51] Int. Cl.² .................. G01C 3/08; G01J 1/32; F41G 3/00; G01J 1/36
[52] U.S. Cl. .................. 356/4; 244/3.16; 250/205; 362/290
[58] Field of Search .................. 356/4; 250/205; 362/290; 315/11, 12; 244/3.16

[56] References Cited

U.S. PATENT DOCUMENTS

| | | | |
|---|---|---|---|
| 2,653,516 | 9/1953 | Johnson | 362/290 |
| 2,699,515 | 1/1955 | Williams | 362/290 |
| 3,361,912 | 1/1968 | Lundberg | 356/4 |
| 3,461,295 | 8/1969 | Camack | 362/290 |
| 3,670,198 | 6/1972 | Lehovec et al. | 315/11 |
| 3,780,967 | 12/1973 | Evers et al. | 244/3.16 |
| 3,919,543 | 11/1975 | Noren | 362/290 |

*Primary Examiner*—Samuel W. Engle
*Assistant Examiner*—Thomas H. Webb
*Attorney, Agent, or Firm*—Philip J. McFarland; Joseph D. Pannone

[57] ABSTRACT

Various embodiments of optical apparatus incorporating a foraminous plate to define a field of view are disclosed. In a first embodiment, the foramina in a foraminous plate are cylindrical with the field of view defined by the ratio of the diameter of each foramen to the thickness of the foraminous plate. The presence, or absence, of a target within the field of view is determined by the electrical signal out of a photodetector actuated by light passing through the foramina. In particular, embodiments illustrating the use of the disclosed optical apparatus as a sensor in a guided missile, the foraminous plate and photodetector are movably mounted in such a missile to allow either bearing or range of a target to be determined.

3 Claims, 11 Drawing Figures

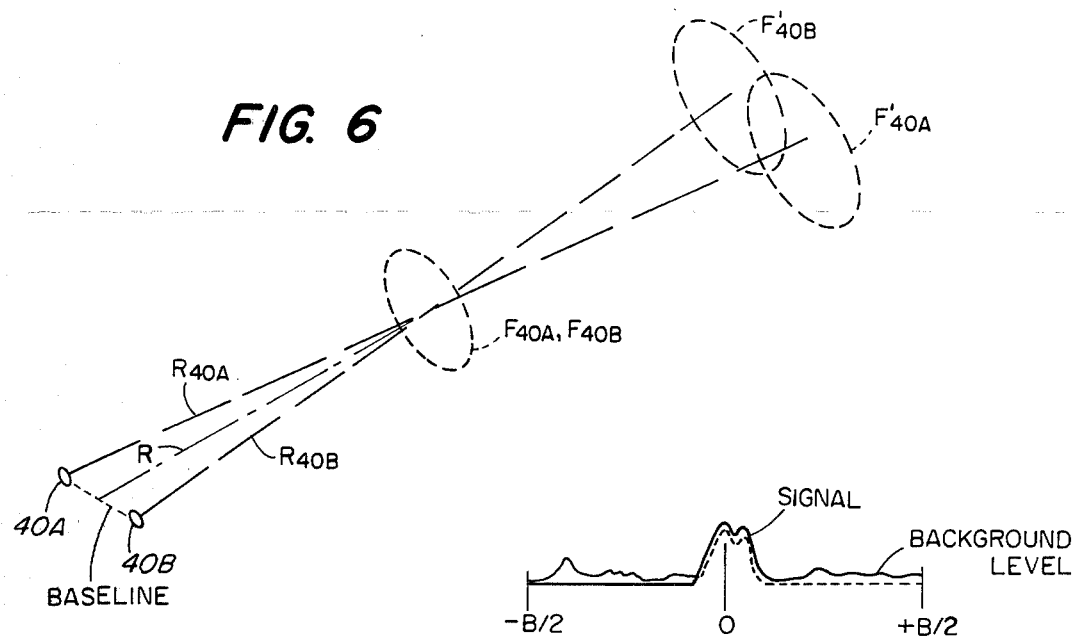
FIG. 6
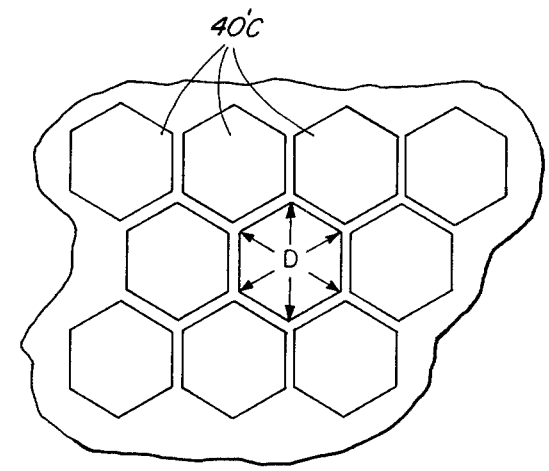
FIG. 7
FIG. 8

OPTICAL APPARATUS

BACKGROUND OF THE INVENTION

This invention pertains generally to optical apparatus and particularly to apparatus of such type having a relatively narrow field of view.

It has been known in the optical art for many years that the size of the field of view, meaning the magnitude of the solid angle visible through an optical instrument, may be controlled by use of an appropriate light baffle. For example, a relatively narrow field of view is provided in some signaling devices by installing a light at the base of a hollow tube. The field of view of such a device then is defined (in radians) by the ratio of the diameter of the hollow tube to its length.

When the field of view of an optical instrument designed to receive light (meaning any electromagnetic energy having a wavelength between that of radio frequency energy and X-rays) is to be limited, alternative approaches other than using light baffles may be used. That is, advantage may be taken of the characteristics of lenses and mirrors which are usually elements in optical instruments to restrict the field of view. For example, in an astronomical telescope wherein the focal length of an objective lens, or mirror, must be relatively long to minimize aberration, a relatively narrow field of view is a necessary condition for operation.

In X-ray technology it is well known that so-called "collimators" may be used. For example, in the so-called "Anger camera" (described in U.S. Pat. No. 3,011,057) a thick block of radiation-opaque material, say lead, may be perforated to form a number of parallel elongated collimation channels which allow only radiation parallel to such channels to pass. Because the channels are, however, formed by machining, the diameter of each is far, far greater than the wavelength of the radiation to be passed. It follows, therefore, that no practical effects of diffraction are experienced. On the contrary, however, when optical (including infrared) wavelengths are to be passed the diameters of the channels used for X-rays are such that appreciable diffraction may be experienced. For this reason, no collimators of the type used for X-rays have ever been used for optical wavelengths. Another point should be made about collimators used for X-rays: That is, there has been no recognition in the art that the interior surfaces of the channels have any significant effect on the efficacy of such channels to collimate X-rays. This failure probably arises from the fact that the materials from which X-ray collimators are made reflect only those X-rays which almost graze the interior surfaces of the channels. It follows, then, that reflections from interior surfaces are of no moment. On the other hand, at optical frequencies, reflection of rays at almost any angle to the longitudinal axis of a channel may allow light energy to pass through to the great detriment to the field defining qualities of a channel.

To reduce the effects of reflection from channel walls, the inventor here has previously taught that channels may be made by using clad fibers wherein the index of refraction of the cladding material is lower than the index of refraction of the core material. The field of view of each such channel, then, is defined by the ratio of the diameter of the core to the length of the core. Light falling on the interface between the core and the cladding material at an angle greater than the critical angle is refracted so as to be trapped within the cladding material. By choosing materials having indices of refraction which result in a very small critical angle, the effects of reflection may be reduced drastically even though the surfaces involved ordinarily are specular reflectors. While a large number of channels made in the manner just described may be joined together to form a "channel plate" which has application in an electrooptical device such as an image intensifier, the resulting assembly is expensive to build. Further, losses are experienced by reason of the basic fact that the core material is glass.

Another problem in the art, especially in the art of optical seekers for guided missiles, is that scattering due to diffuse reflection in the atmosphere limits the maximum contrast between a target in a field of view and the background within such field. The diffuse reflections from the background constitute noise with which the energy from the target must compete. There is no satisfactory remedy known for this effect.

SUMMARY OF THE INVENTION

With the foregoing in mind, it will now be realized that a primary object of this invention is to provide, in an optical instrument, improved means for limiting the field of view of such an instrument.

Another object of this invention is to provide an improved channel plate for radiant energy at any optical frequencies, such plate being adapted to allow the radiant energy from a limited field of view to be integrated.

Still another object of this invention is to provide an improved channel plate for radiant energy at optical frequencies, such channel plate not having any solid material within any one of the channels.

Another object of this invention is to provide an improved channel plate for radiant energy at optical frequencies, such channel plate being adapted to be used as an element in an optical instrument such as a sensor in a guided missile.

A still further object of this invention is to provide improved optical apparatus which is substantially insensitive to diffuse reflections in the background of any field of view.

A final specific object of this invention is to provide improved optical apparatus wherein optical energy is collimated without necessarily being passed through a refractive material or being reflected from a mirror.

BRIEF DESCRIPTION OF THE DRAWINGS

These and other objects of this invention are attained generally by providing, in combination, a foraminous plate of substantial thickness, the foramina in a preferred embodiment being parallel one to another and substantially cylindrical in shape with substantially non-reflective walls and a photodetector disposed to be actuated by light passing through the foramina. When the contemplated combination is used as a seeker in a guided missile, the electrical signal out of the photodetector is processed in a conventional manner to determine when a significant change in the level of such electrical signal occurs, thereby to provide an indication of bearing or range of a target.

For a more detailed explanation of this invention, reference is now made to the following description of the accompanying drawings wherein:

FIG. 6 is a sketch illustrating the manner in which a pair of channel plates may be used together;

FIG. 7 is a sketch qualitatively illustrating the electrical signals out of the channel plates of FIG. 6;

FIG. 8 is a sketch showing an alternative shape of the openings in a channel plate;

DESCRIPTION OF THE PREFERRED EMBODIMENTS

Figure 1:
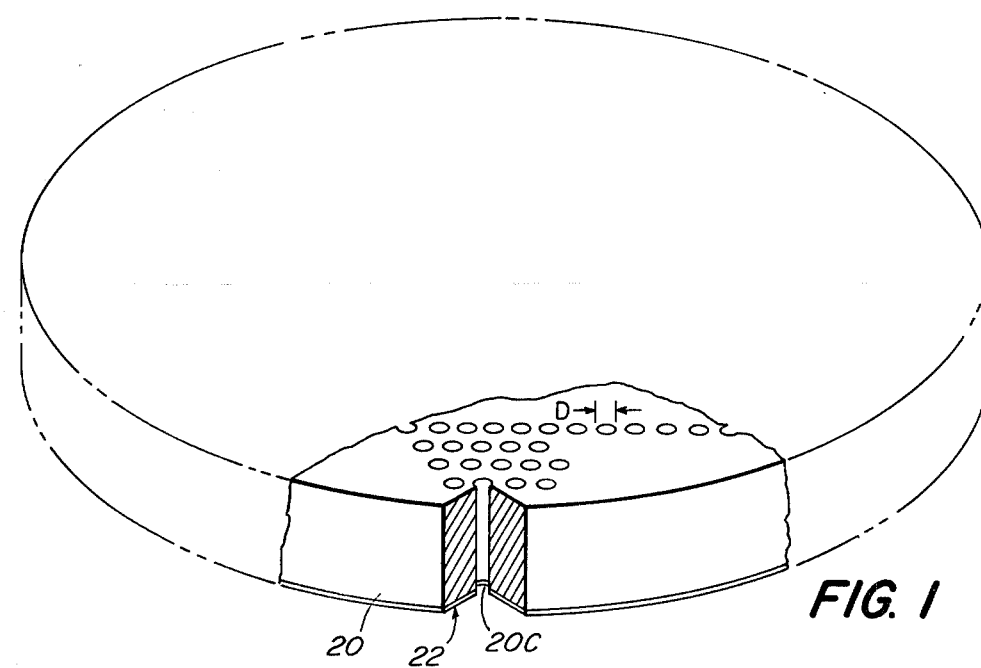
FIG. 1 is a partial isometric view, somewhat simplified for clarity, of a first embodiment (sometimes referred to as a channel plate) of this invention.

Referring now to FIG. 1, it may be seen that a sensor (not numbered) according to a preferred embodiment of this invention comprises simply a foraminous plate 20 and a photodetector 22 overlying one side of such plate. The openings, or channels 20C, in the foraminous plate 20 are here shown to be substantially parallel and cylindrical in shape. In addition, the diameters, D, of the channels 20C are substantially the same. It should be noted, however, that such limitations are not essential, meaning that the shape and size of the channels 20C may be changed as desired. For example, the channels 20C may have the shapes of truncated cones.

Figure 3:
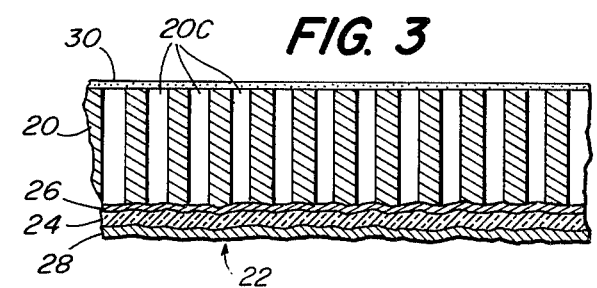
FIG. 3 is a partial cross-section of the embodiment of FIG. 1 modified to show a filter over the open ends of the channels.
Figure 11:
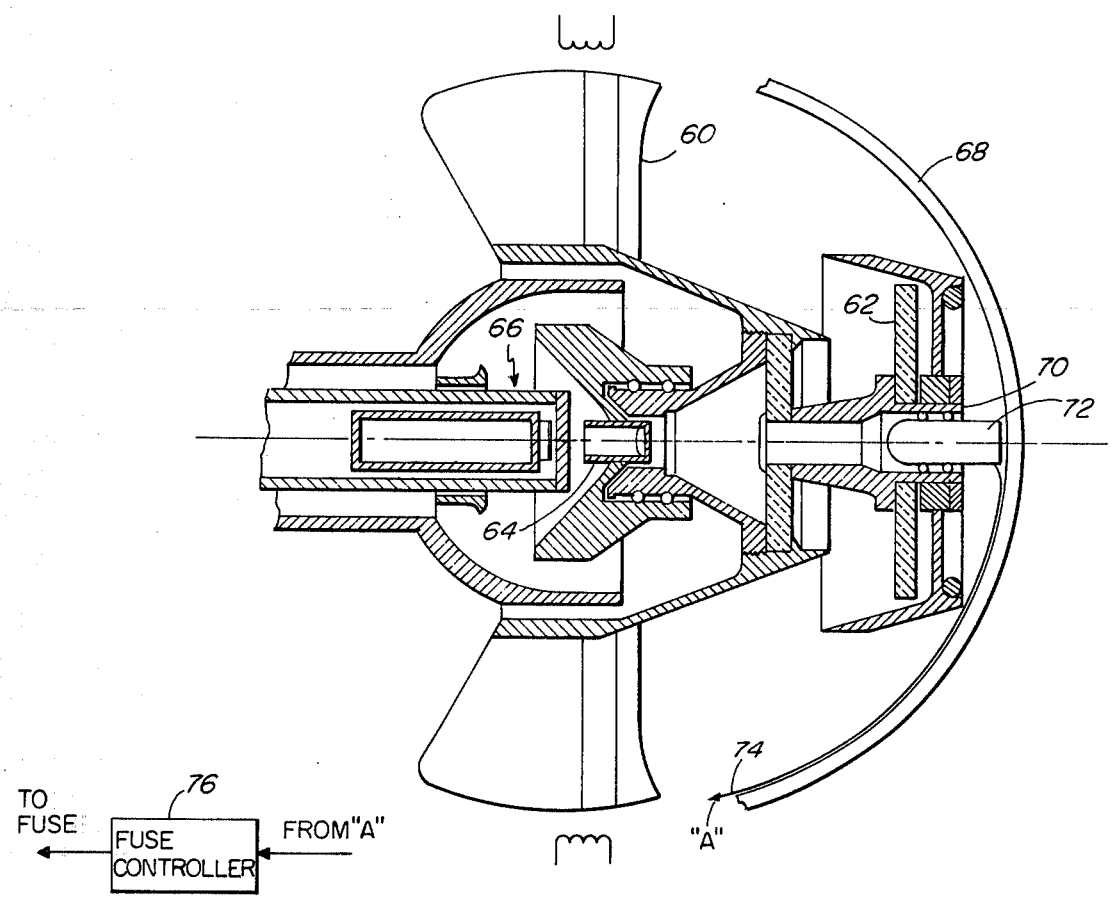
FIG. 11 is a cross-sectional view of a known infrared seeker incorporating this invention.

As shown more clearly in FIG. 3, the photodetector 22 comprises a layer 24 of a photosensitive material between a metallic flash 26 and a metallic backplate 28. Electrical leads (not shown) connected, respectively, to the metallic flash 26 and to the metallic backplate 28 then serve to carry electrical signals generated by radiation falling on the layer 24 of photosensitive material to processing circuits (such as a fuse controller as shown in FIG. 11). It is noted here in passing that, if the material of the foraminous plate 20 is electrically conductive, the connection to the metallic flash 26 obviously may be effected through the foraminous plate 20.

Again as shown in FIG. 3, a filter 30 may be disposed in any convenient manner to overlie the open ends of the channels 20C. The filter 30 may be used whenever it is desired to take advantage of a particular characteristic of the radiant energy desired to be passed to the photodetector 22. For example, if it be desired to sense infrared radiation as that from a jet aircraft, the filter 30 would preferably be a contrast filter to pass infrared radiation. The photosensitive material 24 in such case preferably would be lead sulfide or lead selenide. Alternatively, if the polarization of the radiant energy to be sensed is known, the filter 30 would be a polar filter.

Figure 2:
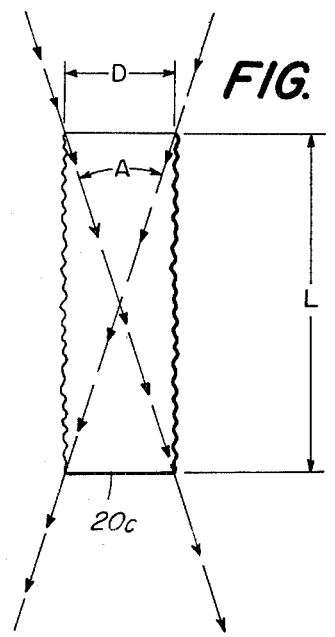
FIG. 2 is a sketch showing how each opening, or channel, in the embodiment of FIG. 1 is arranged to define a field of view.

Referring now to FIG. 2, it may be seen that, in theory, the field of view of each one of the channels 20C is determined by the ratio of the diameter, D, to the length, L, of each one of the channels 20C. The latter dimension, in turn, is equal to the thickness of the foraminous plate 20 (FIG. 1). Thus, $$A/2 = \tan^{-1} D/L \qquad \text{Eq. (1)}$$

where A is the size, in degrees, of the field of view.

It will be recognized that practical considerations make it impossible to limit the field of view to the theoretical size defined by Equation (1). The major practical consideration is that the wall of each one of the channels 20C (FIG. 1) cannot be made to absorb all radiant energy incident thereon. To put it another way, the wall of each one of the channels 20C (FIG. 1) is at least partially reflective to light. Because of this, light (albeit attenuated in accordance with the number of reflections in passing through the foraminous plate 20, FIG. 1) originating at a point outside of the field of view may fall on the photosensitive material 24 (FIG. 3). To reduce the intensity of any light falling on the photosensitive material 24 (FIG. 3) after reflection from the wall of any one of the channels 20C (FIG. 1), the coefficient of reflectivity at each wall is reduced to a minimum and the surface is made to be "optically" rough (meaning that the surface not be smooth enough to allow specular reflections). A coating (represented by the nonuniform lines in FIG. 2) of a material such as lampblack deposited in any convenient manner on the walls of the channels 20C (FIG. 1 and FIG. 3) effectively reduces the coefficient of reflectivity and prevents almost all specular reflection.

Figure 4:
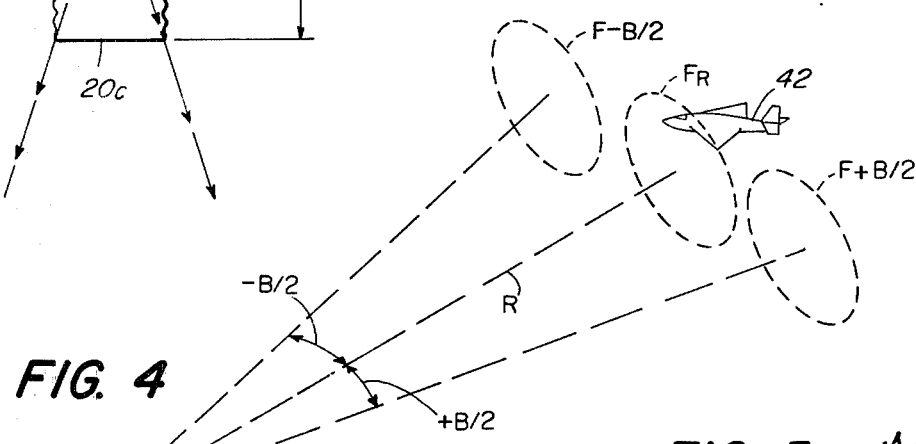
FIG. 4 is a sketch illustrating how a target, here an aircraft, may be tracked using the embodiment of FIG. 1.
Figure 5:
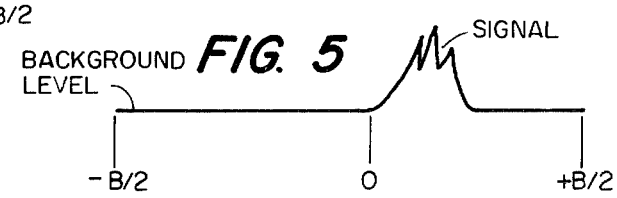
FIG. 5 is a sketch qualitatively illustrating an electrical signal resulting from tracking according to FIG. 4.

Referring now to FIGS. 4 and 5, one way of using the sensor shown in FIG. 1 is illustrated. For convenience, because many different mechanisms for scanning a sensor are known and because such mechanisms do not, per se, constitute a part of this invention, FIG. 4 has been simplified by not showing any scanning mechanism. Suffice it to say here that a scanning mechanism is provided to move a sensor 40 (similar, say, to that shown in FIG. 1) in a programmed manner. Here the movement is cyclic from a reference line, R, through angles $+B/2$ and $-B/2$. An aircraft 42 is here assumed to be in the field of view of the sensor 40 at some time as such sensor is scanned. It will be now apparent, as shown in FIG. 5, that whenever the aircraft 42 is within the field of view of the sensor 40 the electrical signal out of the sensor 40 changes to indicate that an object is within the field of view. The change is due to the fact that the light passing through the channels 20C (FIG. 1) increases from a background level when the aircraft 42 is within the field of view. That is to say, the light in the different ones of the channels 20C (FIG. 1) is, in effect, integrated to produce the signal shown in FIG. 5.

Referring now to FIG. 6, the theory of operation of a stadimetric arrangement using two sensors is illustrated. Again, as with the arrangement shown in FIG. 4, scanning mechanism has not been shown here. Thus, two sensors 40A, 40B (each one being similar to the sensor shown in FIG. 1) are mounted at the ends of a baseline of known length. The boresight axes $R_{40A}$ and $R_{40B}$ here are shown to intersect at a distance, R, from the baseline so that the fields of view, $F_{40A}$, $F_{40B}$ of the sensors 40A, 40B substantially coincide at that distance. At greater distances than the distance R from the sensors 40A, 40B, the fields of view $F'_{40A}$, $F'_{40B}$ of the sensors 40A, 40B are not substantially coincident. It will be evident, therefore, that if a target such as an aircraft (not shown) is located at the distance R, the electrical signals out of the sensors would be as shown qualitatively in FIG. 7. If, on the other hand a target were at a greater distance than the distance R (and not within the overlapping portions of the fields of view $F'_{40A}$, $F'_{40B}$), the electrical signals out of the sensors 40A, 40B would not be substantially coincident in time. Conventional logic circuitry, as for example a differential amplifier having the outputs of sensors 40A, 40B as its inputs, then could be used to distinguish between the two different cases.

It will be apparent to one of skill in the art that the approach illustrated in FIG. 6 could be easily modified to maintain the boresight axes $R_{40A}$, $R_{40B}$ parallel as scanning is accomplished.

Referring now to FIG. 8, an alternative cross-sectional shape of the channels in a sensor such as the sensor 40 (FIG. 4) is shown. Thus, each channel 40'C in the embodiment shown in FIG. 8 is hexagonal. Such a shape may be advantageous when it is desired to maximize the total area of the channels in a foraminous plate of a given size. The dimension, D, then is the quantity "D" in Equation (1).

Figure 9:
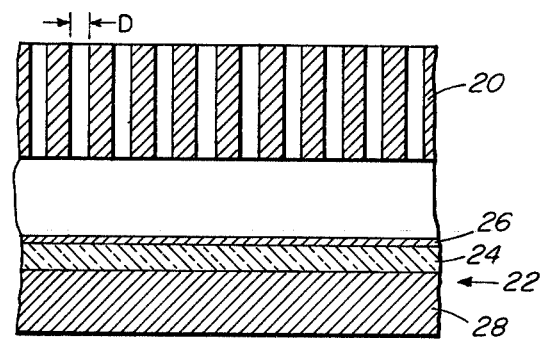
FIG. 9 is a partial cross-section of an alternative embodiment of this invention.

Referring now to FIG. 9, an alternative form of the sensor shown in FIGS. 1 and 3 is shown. In FIG. 9, the foraminous plate 20 and the photodetector 22 are spaced from each other in any convenient manner. The photodetector 22, as before, comprises a layer 24 of a photosensitive material between a metallic flash 26 and a metallic back plate 28.

Figure 10:
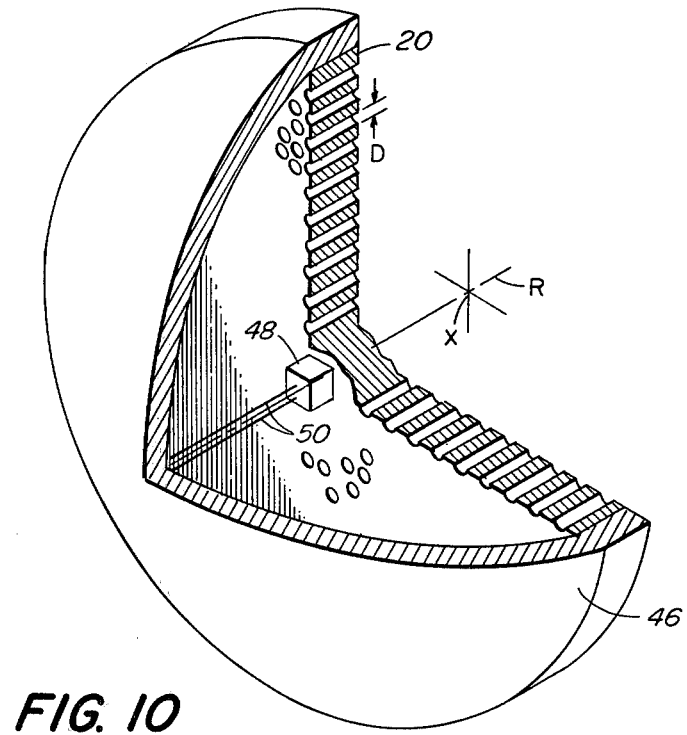
FIG. 10 is a sketch, partially broken away and somewhat simplified, of an alternative embodiment of this invention.

Referring now to FIG. 10, an embodiment of this invention using a relatively small photodetector (or a number of relatively small photodetectors) is shown. Thus, in FIG. 10, a curved mirror 46 (here a spherical segment of one base, or a spherical cap) is disposed as shown on one side of a foraminous plate 20. The center of curvature of the curved mirror 46 is on the boresight axis of the foraminous plate 20 at the point marked "X". A photodetector 48 is affixed to the foraminous plate 20 in any convenient manner with associated electrical leads 50 (shown partially and diagrammatically) led through the center of the curved mirror 46. The radius of the curved mirror 46 here is such that the active surface (or surfaces) of photodetector 48 are at the focal point of the curved mirror 46. It will be apparent, therefore, that any light from any point within the field of view defined by the channels (not numbered) in the foraminous plate 20 will, upon reflection from the curved mirror 46, be directed toward the focal point of that mirror and will fall on the photodetector 48.

It will be obvious to one of skill in the art that the curved mirror 46 need not be spherical. That is to say, the curved mirror may be either ellipsoidal or paraboloidal. It will also be obvious that the photodetector 48 may consist of four different elements, each one being exposed to light passing through a different half (top half, bottom half, right half and left half) of the foraminous plate 20. With such an arrangement, the electrical signals out of the four different elements may be combined in the same manner in which signals in a monopulse radar are combined. An "optical" monopulse sensor then would result.

It will be evident that in the embodiments shown in FIGS. 9 and 10 diffraction effects may become significant if the dimension "D" approaches the wavelength, l, of the light falling on the foraminous plate 20. If the channels (not numbered) are cylindrical, a significant Airy ring is formed at the output end of each channel by the light passing through each channel. The angular divergence (A.D.) of such ring is in accordance with the well known formula:

$$A.D. = 2.44(l)/D \qquad Eq. (2)$$

where A.D. is the angular divergence in radians.

One or more fringes may also be present. It is emphasized, however, that the existence of any significant diffraction effects is not material to the contemplated operation of the sensors shown in FIGS. 9 and 10 for the reason that both embodiments shown (and, as a matter of fact, all other sensors shown) depend not on the imaging of the contents of a field of view for proper operation but rather on the summation of the contributions to the final result of the light through a large number of channels. Therefore, whether or not significant diffraction occurs, the embodiment shown in FIG. 9 is operative. Diffraction may, on the other hand, cause some aberration in the embodiment shown in FIG. 10.

Referring now to FIG. 11, an embodiment of this invention, as for example that shown in FIG. 10, used in combination with a known infrared seeker is shown. The details of the seeker are shown and described in U.S. Pat. No. 3,872,308 assigned to the assignee of this application. Suffice it to say here that the infrared seeker comprises a Cassegrainian arrangement consisting of a paraboloidal mirror 60 (the primary mirror of the optical system), a hyperboloidal mirror 62 (the secondary mirror of the optical system), a light pipe 64 and a photodetector 66. The complete optical system is mounted within a so-called IR dome 68 of a missile (not shown) so that the boresight axis of the system may be moved relative to the roll, pitch and yaw axes of the missile. The hyperboloidal mirror 62 is rotatably mounted in a hub 70 on the boresight axis of the paraboloidal mirror 60. The hyperboloidal mirror 62 is arranged so that there is a small acute angle between its boresight axis and that of the paraboloidal mirror 60. Therefore, as the hyperboloidal mirror 62 is rotated, a conical scan is effected.

A sensor 72 (which preferably is constructed as shown in FIG. 10) is mounted on ball bearings (not numbered) within the hub 70 so that the boresight axis of sensor 72 corresponds with the boresight axis of the hyperboloidal mirror 62. Electrical leads 74 are led in any convenient manner from the sensor 72 to a fuse controller 76. The latter, in its simplest form, for expository reasons may be a differential amplifier (not shown) to compare the level of a reference voltage source (not shown) with the level of the signal out of the sensor 72 and to produce a trigger signal on a lead (not numbered) to the fuse (not shown) for ordnance (not shown) in the missile.

It will be evident to one of skill in the art that the level of the output of the sensor 72 is inversely proportional to range to any target being tracked. Therefore, by appropriate adjustment of the level of the reference voltage, the range at which a trigger signal is transmitted to the fuse may be adjusted.

It will also be evident to one of skill in the art that the sensors contemplated by this invention and shown in the various figures are inherently difficult to jam. That is to say, because the electrical signal out of the sensors is the result of the summation of the contributions of all of the channels in a foraminous plate, only sources within the fields of view of the channels may be effective to contribute to the electrical signal. It follows, then, that once tracking has begun, any source of jamming signals which is detected must almost certainly be in the same field of view as the target being tracked. When such a situation obtains, the existence, or absence, or a jamming signal is immaterial to the completion of a successful intercept.

Although the illustrated embodiments of this invention using a photodetector which is responsive to light directly out of the channels all use a single layer of a photosensitive material, it will be obvious to one of skill in the art that individual photodetectors may be provided for each channel, or for selected groups of channels. Thus, photographic techniques similar to those used for many years to form the mosaic of phosphor dots in color television picture tubes of the shadow mask type may be used to form the desired pattern of photodetectors. The photographic techniques just referred to comprise the steps of: (1) preparing a master negative of the pattern of channels; (2) covering a blank with a photosensitive resist material and exposing such material through the master negative; (3) removing the unexposed photosensitive resist material and etching the blank to form the foraminous plate; (4) using the foraminous plate as a master, exposing the photodetector such as the ones shown in FIG. 1 and FIG. 9 (after, of course, covering the exposed surface with a photosensitive resist material); (5) removing the unexposed photosensitive resist material and etching away the then exposed portion of the metallic flash (numbered 22 in FIGS. 1 and 9) and the finally exposed portion of the photosensitive material (numbered 24 in FIGS. 1 and 9); and (6), removing the remaining photosensitive resist material. It will be obvious to one of skill in the art that, in adapting the photographic techniques just generally described, registration must be maintained between the foraminous plate (when used as a negative to locate the areas of the photosensitive material to be left in the photodetector) and the photodetector during exposure and after the photodetector has been removed for processing and then replaced. To accomplish this, known mounting means (not shown) such as the mounting means uniquely locating the shadow mask and phosphor screen of a color television picture tube obviously may be adapted to this purpose.

Alternatively, the channels may be made by adapting known techniques for drawing wire. That is to say, each channel may be formed by: (1) drawing a wire consisting of a core of a first material and a cladding of a second material until the diameter of the core equals the desired diameter of the channel; (2) cutting the drawn wire so that the lengths of the segments of wire are the same as the desired thickness (the dimension "L" in FIG. 2) of the foraminous plate; (3) joining the segments of wire in any convenient way to form a blank of the desired foraminous plate; and (4) etching the cores of the assembled segments of wires finally to form the desired channels.

Whatever method of forming the foraminous plate is adapted, it will be evident that, whenever necessary, the walls of the channels may be roughened and blackened as the last step in fabricating such a plate. As mentioned hereinbefore, lampblack may be applied for this purpose. Other techniques may, however, be even more efficacious. For example, if the foraminous plate is made from copper, a satisfactory coating of cupric oxide may be formed on the walls of the channels simply by heating the foraminous plate in air.

It will be noted here that the material of the foraminous plate may be chosen from a large group of materials. The exact material chosen will depend upon the desired characteristics of the material in any particular application. Specifically, if infrared radiation is to be detected, the material should have a relatively high coefficient of conductivity of heat. It would follow, then, that the foraminous plate would preferably be made using either a metal or a metallic solution in either a glass or a plastic as the material for the foraminous plate.

Although it has been chosen to show a spherical mirror in the arrangement shown in FIG. 10 and to point out that either a paraboloidal or an ellipsoidal mirror may be substituted for such spherical mirror, it will be apparent to one of skill in the art that mirrors of still different shapes may be used. For example, a conical mirror having a half-apex angle of 45° could be used. With a mirror of such shape, light parallel to the boresight axis of the foraminous plate 20 would be reflected toward the boresight axis. The photodetector 48 would then, of course, be replaced by a relatively long photodetector disposed along the boresight axis of the foraminous plate between such plate and the apex of the conical mirror. Another example of a different shape of mirror is that a so-called "Rambauske" paraboloidal or ellipsoidal mirror could be used. Such shapes and the advantages accruing from their use are shown and described in U.S. Pat. No 3,982,824 issued Sept. 28, 1976 and assigned to the same assignee as the present invention. Suffice it to say here that the various "Rambauske" mirrors would provide a focal circle on which one or more photodetectors (such as photodetector 48) may be disposed.

Having now described several embodiments of this invention and methods for making such embodiments, it will now be apparent to one of skill in the art that many different modifications to the invention may be made without departing from my inventive concepts. For example, even though the illustrated examples show that the channels in any given foraminous plate are of the same size and are parallel to each other to form a planar array of channels, there is no need for such limitations. It is felt, therefore, that this invention should not be restricted to its disclosed embodiments, but rather should be limited only by the spirit and scope of the appended claims.

What is claimed is:

1. Optical apparatus comprising the combination of:
    (a) a foraminous plate having substantially nonreflective foramina formed therein;
    (b) a conical mirror with a half-apex angle of 45° for concentrating light passing through the foramina, such mirror being disposed to overlie one surface of the foraminous plate; and
    (c) a photodetector disposed along the altitude line of the conical mirror for transducing the concentrated light reflected from the mirror to produce an electrical signal proportional to the amount of such concentrated light.

2. Optical apparatus comprising:
    (a) a first and a second directional optical detector mounted, respectively, on the ends of a baseline to define a first and a second field of view, each one of such detectors including a foraminous plate wherein the individual ones of the foramina are substantially nonreflective to optical energy from a selected target;

(b) means for integrating and transducing optical energy passing through the foraminous plates in each one of the first and the second directional optical detectors from a selected target and from background to produce a first and a second electrical signal; and (c) signal processing means, responsive to the first and the second electrical signal, to produce a signal indicative of the difference between the first and the second electrical signal, thereby to indicate range of a selected target from the first and the second directional optical detectors and, simultaneously, to eliminate substantially all response to optical signals from the background.

3. In a guided missile incorporating an optical seeker wherein a sensor of optical energy is first scanned to detect a target and then is positioned to maintain any detected target within a field of view, an improved optical seeker comprising:

(a) a directional optical detector including a formainous plate wherein the individual ones of the foramina are substantially nonreflective to optical energy from a selected target;

(b) means for integrating and transducing optical energy from the selected target to an electrical signal indicative of the position of the selected target relative to the directional optical detector; and (c) means for controlling the guided missile in accordance with the electrical signal.

* * * * *